United States Patent Office 2,827,915
Patented Mar. 25, 1958

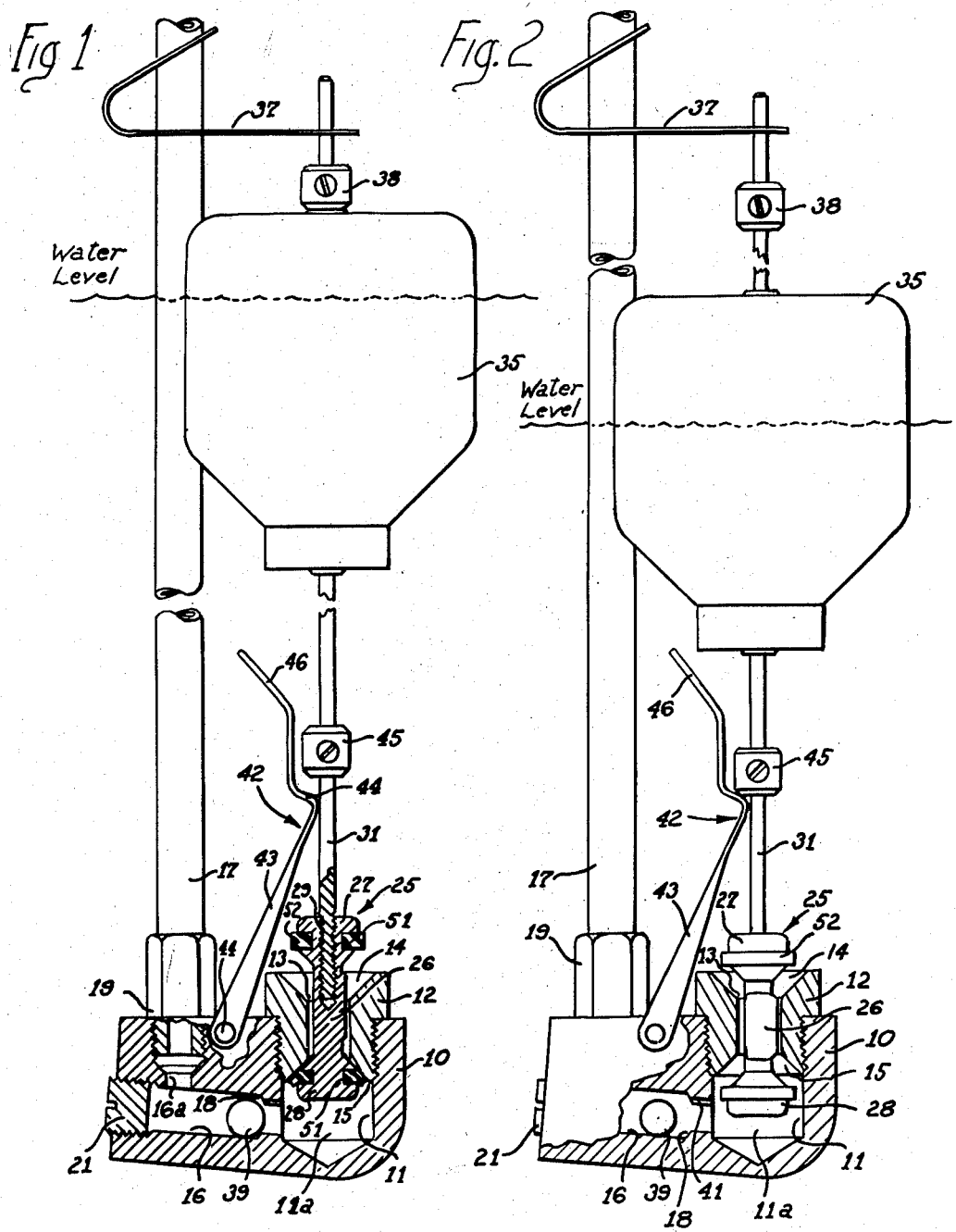

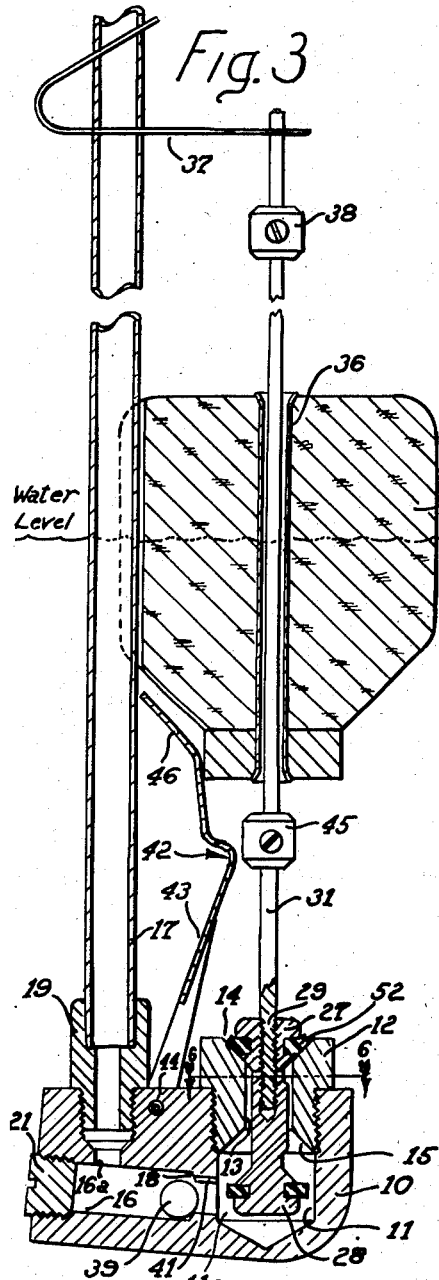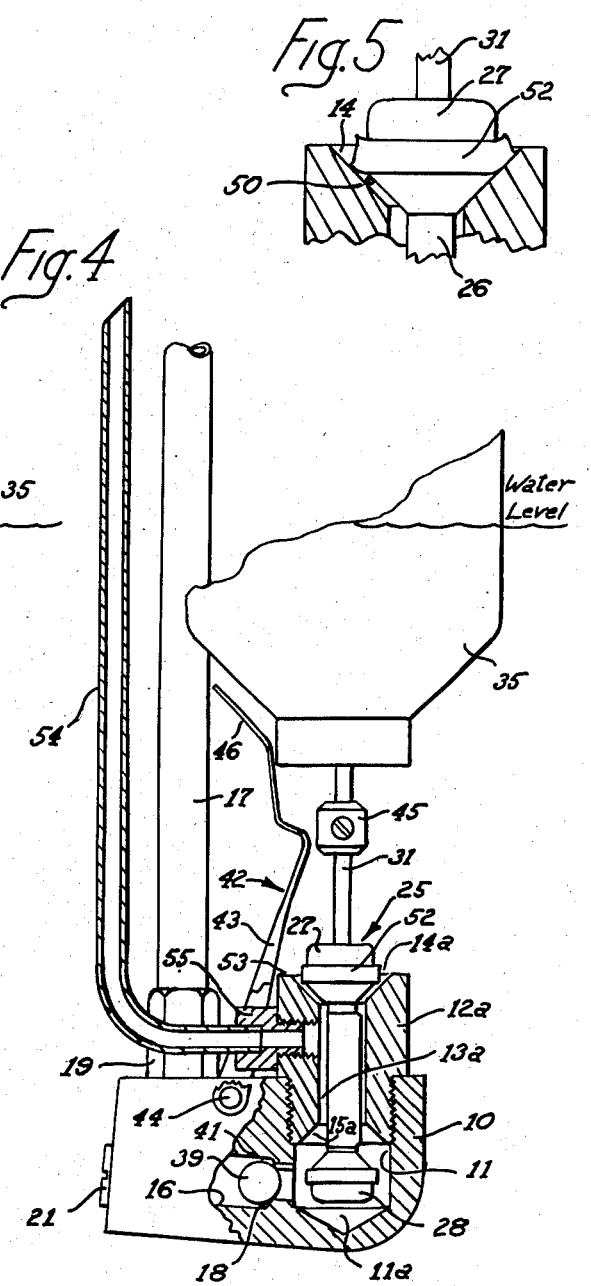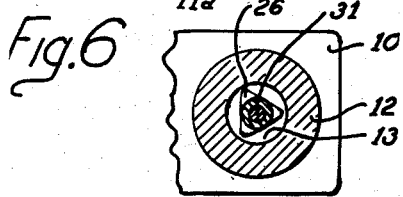

2,827,915
FLOAT VALVE

Wallace F. Mitchell, Arlington Heights, Ill.

Application April 9, 1956, Serial No. 577,053

11 Claims. (Cl. 137—421)

This invention relates to novel and useful improvements in float valves and particularly to a float valve especially adapted for use in a regenerant tank of a water treatment apparatus.

An important object of this invention is to provide an improved float valve, for controlling the upper and lower liquid levels in a container, which is of simple construction, reliable and completely automatic in operation.

Another object of this invention is to provide an improved float valve for use in a container, which float valve is arranged so that the valve member moves rapidly from an open position to a position blocking flow from the container, when the float reaches a preselected lower level, to thereby provide a sharp cut-off of liquid flow from the container.

A further object of this invention is to provide a float valve for controlling the upper and lower liquid levels in a container and in which the float is operatively disconnected from the valve member, when the latter is seated to block flow from the container, to thereby provide more positive seating of the valve member and prevent leakage of fluid.

A more particular object of this invention is to provide a float valve for use in a container and including a valve member adapted to be raised, to block the ingress of liquid into the container and to be lowered to block the egress of liquid from the container, a float having a lost-motion connection to the valve member to raise the latter when the float reaches a preselected upper liquid level in the container, and mechanism for releasably retaining the valve member in a raised position and operative in response to movement of the float to a preselected lower level, to release the valve member and permit the latter to lower and thereby block egress of liquid from the container.

These, together with various ancillary objects and advantages of this invention will be more readily appreciated as the same becomes better understood by reference to the following detailed description when taken in connection with the accompanying drawings wherein:

Figure 1 is a fragmentary side elevational view of the float valve, illustrating the position of the float and valve member after completion of the refill of the container;

Fig. 2 is a fragmentary side elevational view of the float valve with parts broken away and shown in section and illustrating the position of the valve member and float during withdrawal of liquid from the container;

Fig. 3 is a fragmentary vertical sectional view through the float valve and illustrating the valve member in its lowered position blocking egress of liquid from the container;

Fig. 4 is a fragmentary side elevational view of a modified form of float member, with parts broken away and shown in section, and illustrating the float valve at the beginning of the refill of the container;

Fig. 5 is a fragmentary enlarged sectional view through the valve member and seat, illustrating details of construction; and Fig. 6 is a fragmentary horizontal sectional view through the valve member, taken on the plane 6—6 of Fig. 3.

The float valve of the present invention is intended for use in a container (not shown) and to control the introduction and withdrawal of liquid from the container. In particular, the float valve is specifically designed for use in the regenerant tank of a water treatment apparatus to control the upper level of liquid in the tank during the reagent injection step to thereby introduce a measured quantity of reagent into the treatment tank.

The float valve includes a casing, herein shown as a casing 10 having an enlarged bore 11 extending downwardly therein from the top and defining a chamber 11a. A plug 12 is threaded into one end of the bore 11 and is formed with an axial passage 13 therein communicating the chamber 11a in the casing 10 with the container outside the casing. Upper and lower valve seats 14 and 15, respectively, are formed in the plug 12 around the passage 13.

A second passage 16 is formed in the casing 10 to communicate the chamber therein with the conduit 17 through which the liquid is introduced and withdrawn from the container through the valve. In particular, the passage 16 is formed by drilling into one end of the casing 10 and a shoulder 18 is formed in the passage 16, for reasons set forth more fully hereinafter. The conduit 17 is connected by a fitting 19 to the casing 10 and extends upwardly from the casing. An upwardly extending passage 16a is formed in the casing 10 to communicate the passage 16 with the conduit 17, as is clearly shown in Figs. 1 and 3. A plug 21 is provided in the casing to seal the end of the passage 16.

A valve member 25 is provided for controlling the egress and ingress of fluid into the chamber 11a through the passage 13 and is arranged to engage the seats 14 and 15 to block the flow through the passage 13 when the valve member is raised and also when the valve member is lowered. In the specific form shown, the valve member 25 is provided with an elongated shank portion 26 having a length greater than the spacing between the upper and lower valve seats, and spaced head portions 27 and 28. Conveniently, the lower head portion 28 may be formed integrally with the shank 26 and the upper head portion 27 formed separately therefrom to permit assembly of the valve member after insertion of the shank 26 into the passage 13. A threaded bore 29 is formed in the head 27 and extends into the shank 26, and a stem 31 is threaded into the bore to join the upper head portion to the shank.

A float 35 is provided for raising the valve member 25 when the float reaches a preselected upper liquid level in the container to block the flow of liquid from the chamber 11a into the container. The float is connected to the valve member by a lost-motion connection and a latch mechanism 42 is arranged to releasably retain the valve member in a raised position until the float reaches a preselected lower level whereupon the float operates the latch mechanism to release the valve member. The valve member then moves rapidly to its lower position and blocks the egress of liquid from the container.

In particular, the stem 31 extends upwardly from the valve member 25 and the float 35 is mounted on the stem for sliding movement relative thereto. As best shown in Fig. 3, a tubular guide 36 is provided in the float 35 to slidably support the float on the stem 31. The upper end of the stem 31 is slidably supported in a bracket 37 carried by the conduit 17 and, in accordance with the present invention, the shank 26 of the valve member is formed with a polygonal cross section, as best shown in Fig. 6, to guide the valve member and the lower end of the stem 31 in the passage 13.

A stop 38 is affixed to the stem 31, adjacent the upper end therof, and adapted for engagement with the float 35 when the latter reaches a preselected upper liquid level to thereby raise the stem and valve member until the lower head 28 of the valve member seats against the lower seat 15 and blocks the ingress of liquid from the chamber 11a into the container. In order to provide a restricted rate of refill, a check valve 39 is disposed in the passage 16 and adapted to seat against the seat 18. A restricted by-pass groove 41 is formed in the seat 18 to permit a restricted flow of fluid into the chamber 11a, when the valve 39 is seated. Conveniently, the passage 16 may be inclined downwardly as shown in the drawings to normally urge the ball member toward the seat 18.

In the present valve construction, liquid is withdrawn from the container through the same conduit 17 through which liquid is introduced into the container. When the conduit 17 is connected to a low pressure area such as the throat of an ejector, the liquid in the chamber 11a tends to flow through passage 16 into the conduit 17. This reduces the pressure at the underside of the valve member 25 whereby the latter opens, against the buoyancy of the float 35, to thereby permit liquid to flow from the container and through the passage 13 to the conduit 17. As liquid is withdrawn from the container, the float and valve member 25 begin to move downwardly. The latch mechanism 42 releasably retains the valve member 25 in a raised position to permit withdrawal of liquid from the container until the liquid reaches a preselected lower level. In the form shown, the latch mechanism 42 includes a latch member 43 pivoted at its lower end 44 to the casing 10 for vertical swinging movement into and out of engagement with the stem 31. The latch member has a nose portion 44 adapted to engage a stop 45 on the stem and thereby support the stem 31 and valve member 25 in a raised position. A finger 46 is provided on the latch member and extends upwardly and outwardly therefrom to be engaged by the underside of the float 35, as the latter is lowered. The float, riding along the finger 46, cam actuates the latch member 43 out of engagement with the stop 45 whereby the stem and valve member are operatively disconnected from the float and drop under their own weight. The upper head 27 on the valve member is thus moved rapidly to its lowered position to seat on the seat 14 and block the flow of liquid from the container through the passage 13. Since the float is operatively disconnected from the stem, when the valve member is in its lowered position, the fluid does not tend to unseat the valve member. In this manner, leakage of liquid from the container through the passage 13 is prevented.

In accordance with the present invention, the seats 14 and 15 are frusto-conical in shape and the upper and lower heads 27 and 28 are also made frusto-conical in shape to rest on the seats and support the valve member thereon. A peripheral groove 51 is formed in each of the heads 27 and 28 and a relatively thin resilient ring 52 is mounted in the groove and extends radially outwardly from the frusto-conical portion of the heads. This specific construction provides improved operation when the valve is used in a regenerant tank, such as the salt tank in a base exchange water treatment apparatus. In such brine tanks, foreign material, sand or gravel from the foundation bed in the brine tank frequently becomes mixed with the brine withdrawn from the tank. The valve construction disclosed effectively prevents leakage thereby due to the presence of foreign material on the mating surfaces of the valve. As the head on the valve member is moved towards its respective seat, the resilient ring 52 initially engages the seat. Further movement of the head toward the seat causes the resilient ring to deform, as best shown in Figs. 1 and 3 until the head rests upon the seat to prevent further deformation of the ring. The deformation of the ring 52 produces a type of "wiping" action on the seat and tends to clean the seat of any particles that may be present thereon. This insures proper seating of the valve member and aids in preventing the leakage of fluid. However, even the presence of a particle, or particles of foreign material, such as sand or the like on the valve seats 14 or 15, will not prevent the valve member 25 from blocking the flow of fluid through the passage 13. If a particle of foreign material, such as indicated at 50 in Fig. 5, is disposed between the seat 14 or 15 and the conical portion of the respective head 27 or 28, the valve member 25 will shift laterally in the bore 13, as the valve member moves to its lower or upper seated position, until the conical portion of the head rests at one side thereof on the valve seat and at the other side thereof on the particle 50 of foreign material as shown in Fig. 5. The resilient ring 52 on each head projects outwardly of the respective head a distance sufficient to snugly engage the corresponding valve seat and thus seal the passage 13. It is also to be noted that, by reason of the relatively small area of contact between the ring 52 and the respective valve seat, the pressure unbalance on the valve member 25, when the latter is in either its upper or lower seated position, will exert a high pressure per unit area of contact. Therefore, if a particle of foreign material is lodged between the resilient ring and the valve seat, the ring will deform under this high pressure to substantially envelop the particle and form a fluid tight seal with the valve seat.

In the regeneration of base exchange water treatment apparatus, it is sometimes deemed desirable to introduce air with the rinse water to agitate and stir the bed of exchange material. The float valve of the present invention is readily adapted to introduce air into the conduit 17, when the flow of brine from the regenerant tank is interrupted in response to lowering of the valve member 25. The float valve illustrated in Fig. 4 is similar to the float valve illustrated in Figs. 1–3, and like numerals are utilized to designate like parts. The float valve of Fig. 4 differs from that previously described in that the plug designated 12a is formed with a laterally extending passage 53 which communicates with the axial passage 13a therein, intermediate the seats 14a and 15a. A tube 54 is connected, as by a fitting 55 to the passage 53 and extends upwardly from the casing 10, to a point above the lower liquid level at which the float operates to release the retaining means 42 and permit the valve member 25 to move to its lowered position blocking the egress of liquid from the container. With this arrangement, air will be drawn in through tube 54 from a point above the liquid level in the container, when the valve member 25 is lowered to block the flow of liquid from the container.

From the foregoing, it is thought that the operation of the device will be readily understood. The float and valve member are illustrated in Fig. 1 in the raised position at the completion of the refill of the container. When the conduit 17 is connected to a source of suction, such as the throat of an ejector, a reduced pressure is produced in the chamber 11a. This reduced pressure on the lower end of the valve member is sufficient to overcome the buoyancy of the float 35 whereby the valve member 26 lowers sufficiently to permit fluid to flow from the container or tank through the passage 13 out through the conduit 17. As the liquid is withdrawn from the tank, the float 35 lowers until the lower stop 55 strikes the nose 44 of the latch arm. This supports the stem 31 and valve member 25 in a partially raised position, such as shown in Fig. 2, so that the liquid may continue to flow from the tank through the passage 13, as the float 35 is lowered in the tank. When the float reaches a preselected lower level, the underside of the float strikes the cam finger 46 on the latch arm and moves the nose portion out of engagement with the lower stop. The stem and valve member then drop, under their own weight, to their lowered position with the upper head 27 resting on the upper valve seat 14, as shown in Fig. 3. This stops the flow of liquid from the tank through the pipe 13 and the pressure unbalance between the reduced pressure in the chamber 11 and the liquid on top of the valve member 25, further aids in urging the valve member against the seat.

During the subsequent refill of the tank, at which time fluid under pressure is supplied through the conduit 17, the ball valve 34 is moved against the seat 18 by the flow of liquid through the passage 16 and provides a restricted flow of liquid into the chamber 11a through the groove 41 in the valve seat. The liquid flowing into the chamber 11a raises the pressure therein sufficient to move the valve member 25 away from its seat and permits the liquid to flow into the tank. The float 35 rises with the liquid level until it strikes the upper stop 38. The liquid level in the tank will continue to rise until the water displaced by the float exceeds the combined weight of the float, the stem and the valve member, at which time the float will raise the valve member as shown in Fig. 1 and block the flow of liquid into the tank. The latch member 43 is yieldably urged into its latched position and moves into engagement with the rod 31 when the rod is raised at the completion of the refill cycle. Conveniently, the latch member is pivoted so that its center of gravity, in all operative positions thereof, is disposed to the right of the pivot point of the latch member, as viewed in Figs. 1–4, so that the latch member is urged by gravity into its latched position.

The form of the invention illustrated in Fig. 4 operates in the same manner except that, after the valve member 25 seats against the upper seat 14a and blocks the flow of liquid from the tank, the air is introduced through the tube 54 from above the liquid level in the tank. The working parts of the valve including the valve body 10, the valve member 25 and the latch arm 42 are completely submerged at all times in the brine tank. This keeps air from these parts and minimizes corrosion and mineral deposits on the working parts of the valve.

I claim:

1. A float valve of the type adapted to be submerged in a liquid container comprising a casing having an internal chamber, said casing having a first passage leading downwardly in said chamber to provide communication between the chamber and the container and a second passage arranged for connection to a conduit, upper and lower valve seats in said first passage, valve means co-operable with said seats and adapted when raised to block the egress of liquid from said chamber through said first passage and adapted when lowered to block the ingress of liquid through said first passage, a float, a lost motion connection between said float and said valve means adapted when the float rises to a preselected upper level to raise said valve means to block the egress of liquid through said first passage, said valve means being adapted upon withdrawal of liquid from said chamber through said second passage to open to permit liquid to flow through said first passage into said chamber, means for releasably retaining said valve means in a raised position, and means responsive to lowering of said float to a preselected lower level for operating said retaining means to release said valve means and permit the latter to lower and block the ingress of liquid to said chamber through said first passage.

2. The combination of claim 1, wherein said lost motion connection comprises a stem attached to said valve means and extending upwardly therefrom, said float being slidably mounted on said stem, and a stop on said stem engageable with said float to raise the stem and valve means when the float rises to a preselected level.

3. A float valve of the type adapted to be submerged in a liquid container comprising a casing having an internal chamber, said casing having a first passage leading downwardly into said chamber to provide communication between the chamber and the container and a second passage adapted for connection to a conduit, upper and lower frusto-conical valve seats in said first passage, a valve member including a rigid body having spaced frusto-conical portions thereon each adapted to seat on one of said valve seats, an annular resilient ring on each of said frusto-conical portions of said body extending outwardly therefrom to engage said valve seats, said frusto-conical portions of the body being adapted to rest on the valve seat to prevent excessive deformation of said rings, a float, a lost motion connection between said float and said valve member adapted when the float rises to a preselected level to raise said valve member and block the egress of liquid through said first passage, means for releasably retaining said valve means in a raised position, and means responsive to lowering of said float to a preselected lower level for operating said retaining means to release said valve means and permit the latter to lower and block the ingress of liquid to said chamber through said first passage.

4. A float valve of the type adapted to be submerged in a liquid container comprising a casing having an internal chamber, a first passage leading downwardly into said chamber and a second passage arranged for connection to a conduit, an upper valve seat around said first passage, a lower valve seat within said chamber disposed around said first passage, a lower valve member in said chamber shaped to seat against the lower valve seat to close said first passage against the egress of liquid, an upper valve member disposed outside the casing shaped to seat against the upper valve seat to close the first passage against the ingress of liquid, a float, a lost-motion connection between said float and said upper and lower valve members adapted when the float rises to a preselected upper level to raise the lower valve member and close said first passage against the egress of liquid, said lower valve member being adapted upon withdrawal of liquid from said chamber through said second passage to open to permit liquid to flow through said first passage into said chamber, means for releasably retaining said upper valve member in a raised position away from said upper valve seat, and means responsive to lowering of said float to a preselected lower level for operating said retaining means to release said upper valve member and permit the latter to seat on said upper valve seat to block the ingress of liquid to said chamber through said first passage.

5. A float valve of the type adapted to be submerged in a liquid container comprising a casing having an internal chamber, a first passage leading downwardly into said chamber and a second passage arranged for connection to a conduit, an upper valve seat around said first passage, a lower valve seat within said chamber disposed around said first passage, a lower valve member in said chamber shaped to seat against the lower valve seat to close said first passage against the egress of liquid, an upper valve member disposed outside the casing shaped to seat against the upper valve seat to close the first passage against the ingress of liquid, a rod connected to said upper and lower valve members and extending upwardly therefrom, a float slidably mounted on said rod, a stop on said rod adapted for engagement with the float when the latter rises to a predetermined upper level to raise the lower valve member and close the first passage against the egress of liquid, said lower valve member being adapted upon withdrawal of liquid from said chamber through said second passage to open to permit liquid to flow through said first passage into said chamber, means for releasably retaining said upper valve member in a raised position away from said upper valve seat, and means responsive to lowering of said float to a preselected lower level for operating said retaining means to release said upper valve member and permit the latter to seat on said upper valve seat to block the ingress of liquid to said chamber through said first passage.

6. A float valve of the type adapted to be submerged in a liquid container comprising a casing having an internal chamber, a first passage leading downwardly into said chamber and a second passage arranged for connection to a conduit, an upper valve seat around said first passage, a lower valve seat within said chamber disposed around said first passage, a lower valve member in said chamber shaped to seat against the lower valve seat to close said first passage against the egress of liquid, an upper valve member disposed outside the casing shaped to seat against the upper valve seat to close the first passage against the ingress of liquid, a rod connected to said upper and lower valve members and extending upwardly therefrom, a float slidably mounted on said rod, a stop on said rod adapted for engagement with the float when the latter rises to a predetermined upper level to raise the lower valve member and close the first passage against the egress of liquid, said lower valve member being adapted upon withdrawal of liquid from said chamber through said second passage to open to permit liquid to flow through said first passage into said chamber, a latch arm adapted for engagement with said rod to releasably retain said upper valve member in a raised position away from said upper valve seat, and a finger on said latch arm adapted to be engaged by said float when the latter is lowered to a preselected lower level to move said latch arm out of engagement with said rod and permit the upper valve member to seat on said upper valve seat.

7. A float valve of the type adapted to be submerged in a liquid container comprising a casing having an internal chamber, said casing having a first passage leading downwardly in said chamber to provide communication between the chamber and the container and a second passage arranged for connection to a conduit, a conduit connected to said second passage and extending upwardly from said casing, upper and lower valve seats in said first passage, a valve member cooperable with said seats and adapted when raised to seat on one of said seats to block the egress of liquid from said chamber through said first passage and adapted when lowered to seat on the other of said seats to block the ingress of liquid to said chamber through said first passage, a valve stem attached to said valve member and extending upwardly therefrom, a bracket attached to said conduit for guidably supporting the upper end of said stem, a float slidably mounted on said stem, a stop on said stem engageable with said float when the latter rises to a preselected upper level to raise the stem and valve member with the float and block the egress of liquid from the chamber through said first passage, means engageable with said stem for releasably retaining said valve member in a raised position, and means responsive to lowering of said float to a preselected lower level to release said retaining means and permit the stem and valve member to lower and block the ingress of liquid into said chamber through said first passage.

8. The combination of claim 1 including an air inlet conduit communicating with said first passage between said upper and lower valve seats, said air inlet conduit extending upwardly to a point above said preselected lower liquid level at which said float operates said retaining means to release said valve means whereby to introduce air into said chamber when said valve member is lowered.

9. A float valve adapted to be submerged in a liquid container, comprising a casing having an internal chamber, said casing having a first passage leading downwardly into said chamber and a second passage, upper and lower valve seats at said first passage, valve means cooperable with said seats adapted when raised to block the egress of flow from said chamber through said first passage and when lowered to block the ingress of liquid to said chamber through said first passage, an upper stop connected to the valve member, a float positioned to engage and move the upper stop when the liquid level in the container reaches an upper level to move the valve member to an upper position closing egress through said first passage, a lower stop connected to the valve means, a latch positioned for engagement by the lower stop upon withdrawal of liquid from the container to hold the valve means in open position during egress of liquid from the container, and means operative between the float and the latch for releasing the stop from the latch when the float reaches a lower position to effect closing of the valve against egress of liquid from the container.

10. The combination of claim 3 wherein said resilient rings each comprise a flat washer mounted at the base of the frusto conical portion and of greater diameter than the base, whereby the periphery of the washer is deflected by engagement with the seat in seating and unseating of the valve to wipe the valve seats.

11. A float valve for a water softener brine tank adapted for submersion in the brine liquid comprising a valve casing having an internal chamber, the casing having a first passage leading downwardly into said chamber and a second passage for connection to a conduit for the passage of water into the tank and the passage of brine out of the tank by way of said chamber and passages dependent upon pressure conditions in said conduit, upper and lower valve seats at said first passage, valve means extending through said first passage having spaced upper and lower valve members, the upper valve member being positioned to seat against said upper seat in a lower position of the valve means to prevent flow of brine out through said first passage and to unseat in an upper position of the valve means, the lower valve member being positioned to seat against said lower seat in an upper position of the valve means to prevent flow of water into the tank through said first passage and to unseat in a lower position of the valve means, an upper stop connected to the valve means, a float positioned to engage and move the upper stop when the liquid level in the tank reaches an upper level to move the valve means to said upper position terminating flow to the tank through said first passage, latch means operative between said casing and said valve means arranged to engage in response to withdrawal of brine from the tank, to hold the valve means in an intermediate position against the forces of gravity tending to move the valve means to the lower position, for flow of brine out through said first passage, and means operative between the float and the latch means to release the latch when the float reaches a lower position for movement of the valve means to said lower position under gravity and thereby terminate the egress of brine from the tank.

References Cited in the file of this patent
UNITED STATES PATENTS

| 2,230,239 | Eastman | Feb. 4, 1941 |
| 2,504,816 | DeVille | Apr. 18, 1950 |
| 2,710,018 | Wolfe | June 7, 1955 |
| 2,716,422 | Whitlock | Aug. 30, 1955 |